United States Patent [19]

Sturm et al.

[11] Patent Number: 5,264,853
[45] Date of Patent: Nov. 23, 1993

[54] METHOD OF REDUCING FALSE TRACKS DUE TO SUPPRESSION PULSE REPLIES IN AN AIRCRAFT TRACKING SYSTEM

[75] Inventors: Patricia K. Sturm; David F. Weymans; Kathryn W. Ybarra, all of Phoenix, Ariz.

[73] Assignee: Honeywell Inc., Minneapolis, Minn.

[21] Appl. No.: 968,100

[22] Filed: Oct. 29, 1992

[51] Int. Cl.$^5$ ............................................. G01S 13/00
[52] U.S. Cl. ......................................... 342/30; 342/40
[58] Field of Search ....................... 342/29, 30, 32, 36, 342/37, 455, 40; 364/461

[56] References Cited

U.S. PATENT DOCUMENTS

| | | | |
|---|---|---|---|
| 4,027,307 | 5/1977 | Litchford | 342/30 |
| 4,124,850 | 11/1978 | Frazier, Jr. et al. | 342/40 |
| 5,107,268 | 4/1992 | Sturm et al. | 342/36 |
| 5,157,615 | 10/1992 | Brodegard et al. | 364/461 |

Primary Examiner—Mark Hellner
Attorney, Agent, or Firm—Arthur A. Sapelli; W. Udseth; A. Medved

[57] ABSTRACT

In an aircraft which has a tracking system, the aircraft interrogates all target aircraft in the vicinity of the aircraft in order to determine potentially dangerous situations. The interrogation has a predetermined interrogation sequence which includes interrogation pulses and suppression pulses. The target aircraft respond to the interrogation with predetermined parameter information, the target aircraft sometimes responding to the suppression pulses of the interrogation resulting in an indication of false tracks to the monitoring aircraft. A method is implemented which reduces the false tracks resulting from replies to the suppression pulses. The method comprises the steps of forming tracks on responses to the interrogations wherein the responses meet a first set of predetermined criteria. The formed tracks are then identified as suppression pulse tracks or non-suppression pulse tracks in accordance with a second set of predetermined criteria. Lastly, tracks labelled as suppression pulse tracks are inhibited from being displayed by the tracking system as a potentially dangerous target aircraft to the monitoring aircraft.

6 Claims, 4 Drawing Sheets

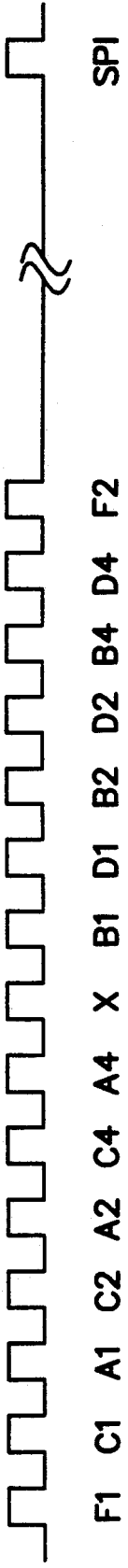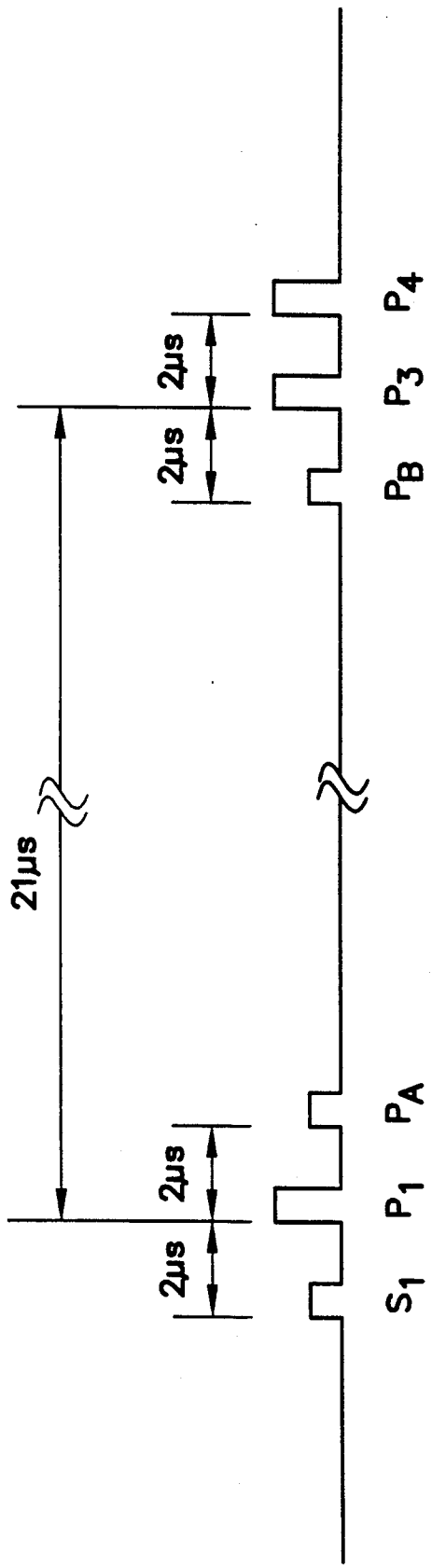
Fig.3
Fig.4

5,264,853

METHOD OF REDUCING FALSE TRACKS DUE TO SUPPRESSION PULSE REPLIES IN AN AIRCRAFT TRACKING SYSTEM

RELATED PATENT APPLICATION

The present application is related to U.S. patent application Ser. No. 07/767,007 allowed May 20, 1992, entitled "Method of Bearing Determination Utilizing a Bottom Antenna in an Aircraft Tracking System", by P. Sturm et al, filed on 27 Sept. 1992, and to U.S. patent application Ser. No. 07/687,965 allowed Jan. 8, 1993, entitled "Improved Track Extension for Use With ATCRBS Surveillance Procedures", by K. Ybarra et al, filed on 19 Apr. 1992 both of the related applications being assigned to Honeywell Inc., the assignee of the present application.

BACKGROUND OF THE INVENTION

The present invention relates to a method of aircraft traffic indication, and more particularly, to a method of aircraft traffic surveillance for analysis to avoid potential collision with other aircraft.

The increased demands placed on the aircraft flight deck as a result of more complex technology, ever increasing aircraft traffic, and increased demands for safety has brought about a requirement for monitoring of aircraft traffic in a vicinity of an aircraft that includes automatic identification of potential threats to the monitoring aircraft. As a result, aircraft can have transponders associated therewith that, in response to appropriate electromagnetic interrogation signals induce responding electromagnetic signals that provide information with respect to the range, altitude, and bearing of the interrogated aircraft. Certain traffic control system transponders, e.g., the Mode S system, include target identification as part of the information imposed on the responding electromagnetic signals. For these Mode S systems, the identification of the path or track of the responding aircraft is relatively simple, involving time dependent positions and altitudes of an identified aircraft. Similarly, extrapolations or extensions of aircraft tracks can be relatively simple. The operation of aircraft collision avoidance apparatus is governed by the Radio Technical Commission for Aeronautics (RTCA) Minimum Operational Performance Standards (MOPS) for Traffic Alert and Collision Avoidance System (TCAS) Airborne Equipment manual document number RTCA/D0185.

In systems (such as the Air Traffic Control Radar Beacon System, ATCRBS) which do not include unique aircraft identification information, the determination of the aircraft tracks is more complicated. The information obtained by periodic interrogation of a multiplicity of unidentified targets, with associated range, altitude and bearing information being provided or determined as a result of the interrogation, can be subjected to well known algorithms to provide a target aircraft track. Once the track is identified, then the extension thereof can be computed to determine if the target aircraft is a threat to the monitoring aircraft.

The track determination is complicated for several reasons generally involving spurious target images. For example, a monitoring aircraft can transmit an interrogation signal to a target aircraft (sometimes referred to herein as an intruder or intruder aircraft since the target aircraft is "intruding" on the monitoring aircraft's airspace), whereupon a transponder in the target aircraft provides a first response signal (direct reply), the delay between the transmission of the interrogation signal and the reception of the first response signal providing the range information. However, the interrogation signal can result in a second response signal that is reflected from the earth's surface. The second response signal, reflected once from the earth, is generally referred to as a single reflection multipath (or type I) reply. Because the length of time for the travel of the second response signal is longer than that for the first response signal, the second response signal can be interpreted as a separate target aircraft at a greater range from the monitoring aircraft. Type I or single reflection multipath also can be generated by an interrogation which reflects off the ground combined with a direct reply. Since the path length is the same as the previous case, the range is the same. Similarly, an interrogation signal can reflect off the surface of the earth, activate the transponder of the target aircraft which provides a response signal that also reflects off the earth's surface. In this instance, since both the interrogation signal and the second response signal are each reflected once from the earth's surface, this reply is referred to as a double reflection multipath (or type II) reply. This response signal will be interpreted by the monitoring aircraft as a target aircraft at an even greater range than indicated by the direct or type I reply. In this situation, a single target aircraft is providing the monitoring aircraft with a plurality of target responses during each interrogation period. Thus, from a single interrogation cycle (consisting of more than one interrogation), up to three responses can be received from a single target aircraft; namely, a direct reply, a type I reply, and a type II reply. These three tracks are referred to as the normal (direct reply) track, and the image tracks (from type I and II multipath replies). A method for reducing the multipath tracks is more fully described in U.S. Pat. No. 5,107,268, entitled "Method of Multipath Track Reduction in an Aircraft Tracking System", by P. Sturm et al, issued 21 Apr. 1992, and assigned to Honeywell Inc., the assignee of the present application.

False tracks are also caused by spurious replies caused by a target (i.e., an intruder) answering the wrong pair of pulses of the interrogation signal. The interrogation signal from a directional antenna of the target aircraft, for the ATCRBS system, consists of a predefined series of pulses using a whisper-shout sequence. The series of pulses includes some suppression pulses, the pulses varying in amplitude and direction in which they are output. The purpose of the suppression pulses is to separate intruders based generally on range and based on quadrant, suppress Mode S type intruders (there being separate interrogations for Mode S intruders), and to cause the intruder not to respond under predefined conditions. Although it is desirable for each intruder to answer only one interrogation, it is common for a singe intruder to answer several interrogations of the Whisper-Shout ATCRBS interrogation sequence. The intruder should answer a predetermined interrogation pulse pair. In practice, however, intruder aircraft sometimes answer an early or late suppression pulse pair. In some cases, it appears that some intruders do not suppress properly and answer multiple interrogation pulse pairs resulting in false tracks.

False tracks are a distraction to the pilot when displayed. Thus, there is a need to eliminate the false tracks caused by the replies to the suppression pulses of the interrogation sequence.

SUMMARY OF THE INVENTION

Therefore there is provided by the present invention a method for reducing false tracks caused by target aircraft responding to suppression pulses in an aircraft tracking system. In an aircraft which has a tracking system, the aircraft interrogates all target aircraft in the vicinity of the aircraft in order to determine potentially dangerous situations. The interrogation has a predetermined interrogation sequence which includes interrogation pulses and suppression pulses. The target aircraft respond to the interrogation with predetermined parameter information, the target aircraft sometimes responding to the suppression pulses of the interrogation resulting in an indication of false tracks to the monitoring aircraft. A method is implemented which reduces the false tracks resulting from replies to the suppression pulses. The method comprises the steps of forming tracks on responses to the interrogations wherein the responses meet a first set of predetermined criteria. The formed tracks are then identified as suppression pulse tracks or non-suppression pulse tracks in accordance with a second set of predetermined criteria. Lastly, tracks labelled as suppression pulse tracks are inhibited from being furnished to collision avoidance logic and from being displayed by the tracking system as potentially dangerous target aircraft to the monitoring aircraft.

Accordingly, it is an object of the present invention to provide a method for reducing false tracks due to suppression pulse replies to an interrogation sequence.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3 shows a pulse pattern of an ATCRBS response;

FIG. 4 shows a pulse pattern of a TCAS ATCRBS interrogation sequence; and

DETAILED DESCRIPTION

Figure 1:
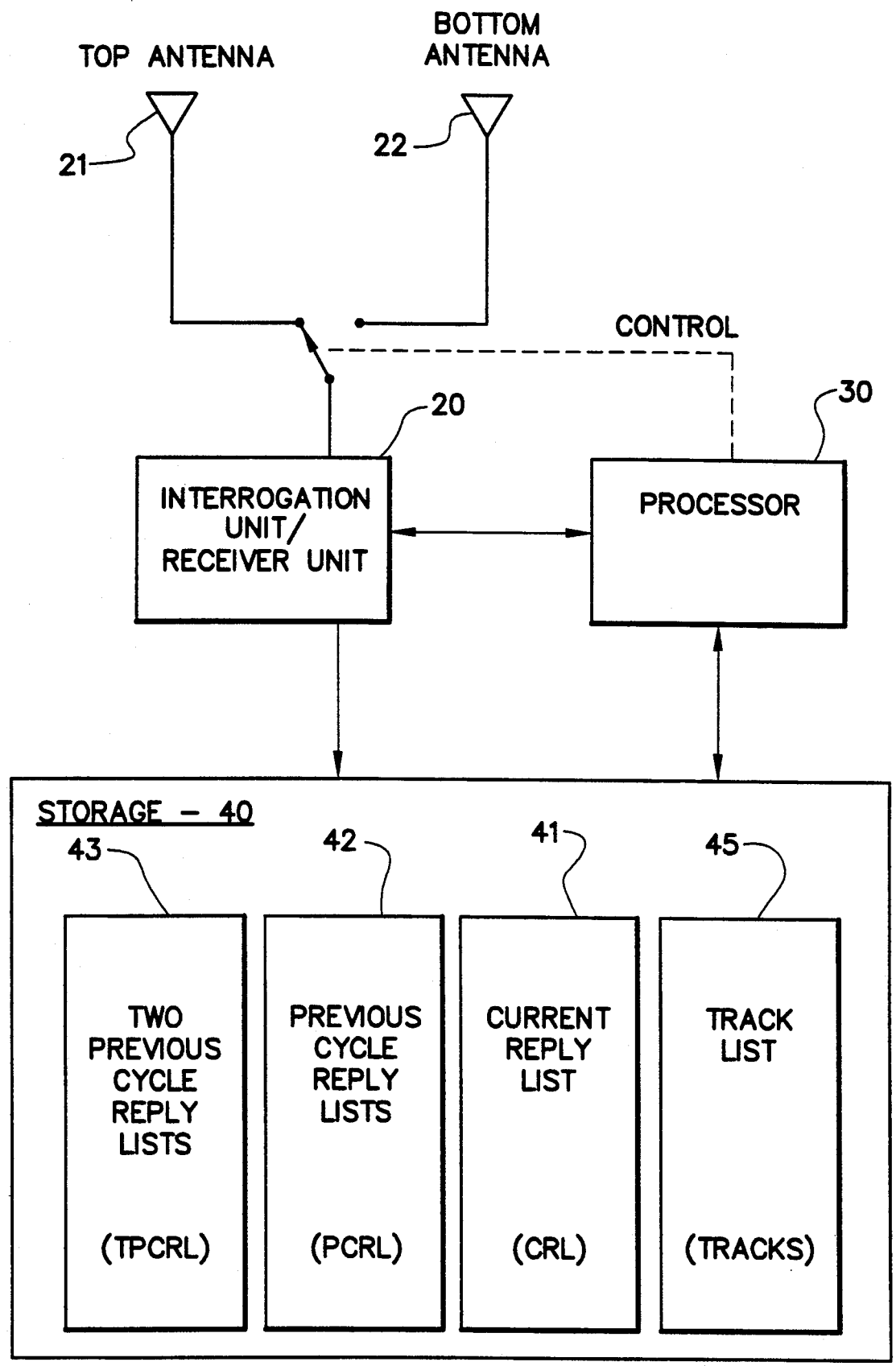
FIG. 1 shows a partial block diagram of a representative system in which the method of the present invention can be utilized.

Referring to FIG. 1, there is shown a block diagram of a representative system in which the method of the present invention can be utilized. An interrogation unit 20 performs a predetermined interrogation sequence transmitting a predetermined pulse sequence, the pulses having varying power values, to a predetermined one of a plurality of antennas, in this example, a top antenna 21 or a bottom antenna 22 as controlled by a processor 30. Replies to the interrogations from a target aircraft, sometimes referred to as an intruder, are received by the respective antenna and processed by the processor 30. The results are coupled to and saved in a storage unit 40, in particular, the current reply list (CRL) 41. The CRL 41 includes processed data for each reply, which includes range, altitude, bearing, ... Part of the preliminary processing includes filtering the raw replies utilizing known techniques such as Raw Reply Elimination. The elimination process utilizes techniques well known, for example if an interrogation transmission is forward and the reply indicates the response is from the rear, this response is discarded (off axis reply) since it will more than likely be duplicated when the interrogation is aft. The storage unit 40 is partitioned to include previous cycle reply lists (PCRL) 42 and another list, two previous cycle reply lists (TPCRL) 43. These lists can be maintained by any standard technique well known in the art. A list of tracks is maintained in a separate track list, TRACKS 45, the tracks being updated by any one of a variety of known techniques, or updated by the technique disclosed in the U.S. Patent referred to above, i.e., U.S. Pat. No. 5,107,268.

Figure 2:
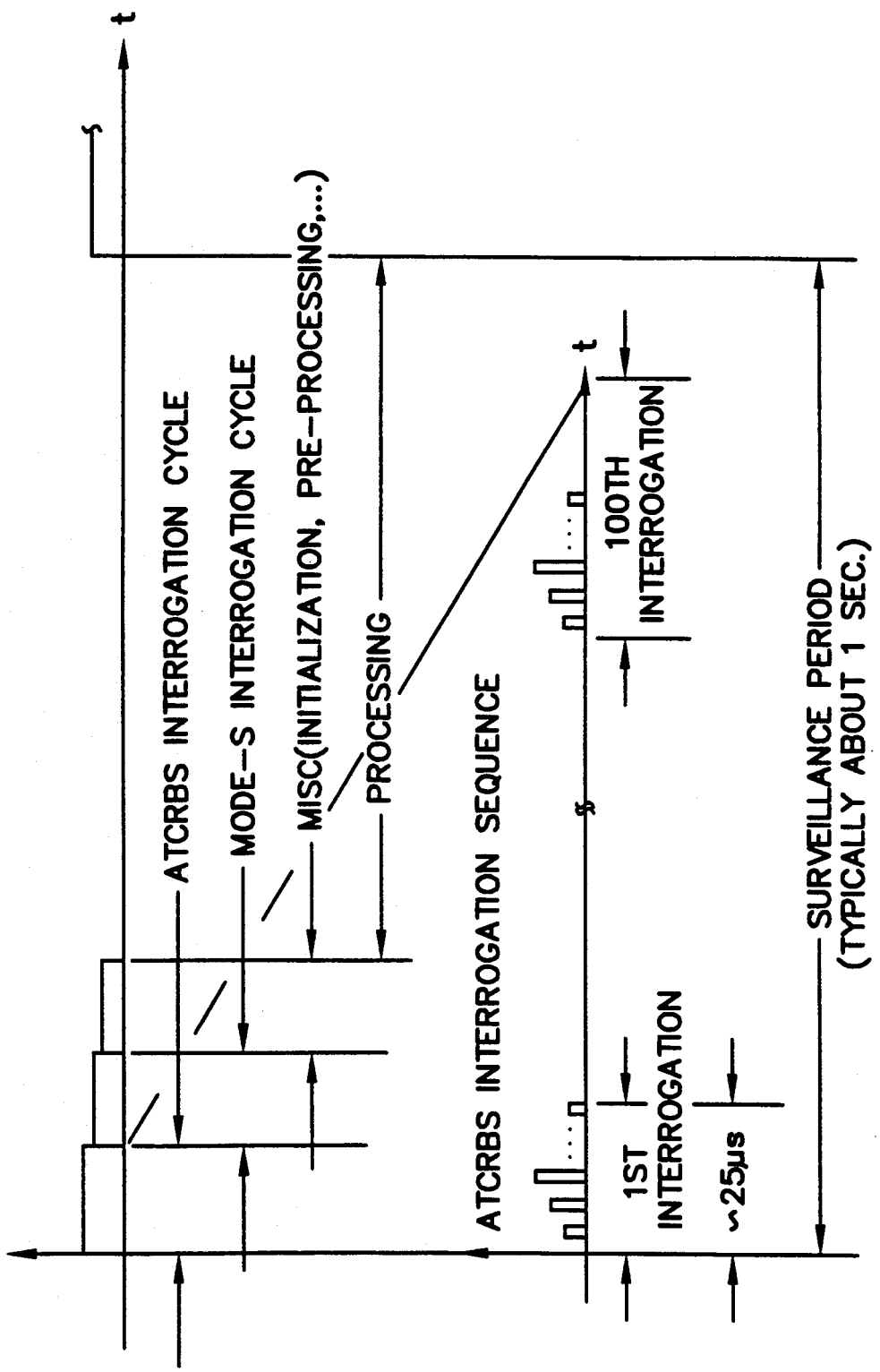
FIG. 2 shows a time line of a surveillance period.

Referring to FIG. 2, there is shown a time line of a typical surveillance period (or cycle) which is also utilized in the TCAS system (the aircraft tracking system) of the preferred embodiment. The surveillance period of the preferred embodiment of the system is approximately 1 sec during which time an interrogation sequence is performed for the ATCRBS systems, Mode S type interrogations take place, and finally the processing of the replies and tracks is performed. The TCAS system of the preferred embodiment of the system in which the present invention can be found uses a Whisper-Shout mode of interrogation for ATCRBS intruders in which interrogation signals of different amplitudes are used to interrogate the target aircraft transponders. Between the threshold of the transponders and the suppression of response when interrogation signals greater than a defined amplitude lead to reception of signals spaced 2 us apart by the transponder, the Whisper-Shout mode provides for assistance in separation of target replies. After the interrogation sequence of a surveillance period is completed, the reply data is stored in the current reply list 41 (CRL) and reply elimination is completed, the updating process of targets begins. The next track in the track list is selected to be updated, the first time through the update processing, the next track is the first track. It will be understood by those skilled in the art that initially pointers, indexes, ... are initialized the first time the processing starts in a surveillance period, the method utilized for maintaining and processing these lists can be any method well known to those skilled in the art and is not critical to an understanding of the method of the present invention.

Referring to FIG. 3, there is shown a bit pattern of an ATCRBS reply. The F1 and F2 pulses of the ATCRBS response are the framing pulses. The C1, A1, ... pulses are the altitude information contained in the response of the target (responding) aircraft in a Mode C data, Gilham coded format altitude response well known to those skilled in the art.

The method of the present invention will now be described. The present invention is directed to a method of reducing false tracks due to an intruder answering the wrong pulse pair of the TCAS ATCRBS interrogation sequence. Referring to FIG. 4, there is shown a pulse pattern of a TCAS ATCRBS interrogation sequence, the interrogation sequence consisting of up to six (6) pulses. The sequence of interrogations comprises approximately 100 interrogations (as shown in FIG. 2) output from either of the two antennas (top and bottom) in a predetermined combination of four directions (0, 90, 180, and 270 degrees) or omni-directionally and of varying power levels. The power of the interrogations varies over a range of approximately 27 dB, in the preferred embodiment. The $P_1$, $P_3$, and $P_4$ pulses are output in the direction of the interrogation at about equal power levels. The $P_1$ and $P_3$ pulses are the main interrogation pulses. These two pulses are the pulse pair which should be identified by the intruder's transponder and answered. The purpose of the $P_4$ pulse is to suppress Mode S transponders from responding to these ATCRBS interrogations. As indicated previously, TCAS interrogates Mode S intruders separately. In some instances, as will be described hereinunder, the $S_1$, $P_A$, and $P_B$ pulses are not output in some of the lower power interrogations in the ATCRBS Whisper-Shout sequence. The $P_A$ and $P_B$ pulses are not output from omni-directional antennas.

Still referring to FIG. 4, details of the interrogation sequence and possible reply scenarios will now be discussed. The $S_1$ pulse is output in the same direction as the $P_1$, $P_3$ and $P_4$ pulses. However, it is output at a power level which is 2 or 3 dB lower than the level of the $P_1$, $P_3$, and $P_4$ pulses. The purpose of the $S_1$ pulse is to cause intruders of different ranges to answer different interrogations, so that all of the intruders in a quadrant do not answer the same Whisper-Shout step. The separation of intruders based on range is only approximate since other factors such as the intruder's receiver sensitivity and path loss from sources other than range also determine which pulses the intruder detects. The $S_1$ pulse is not output in any of the steps with the lowest power level.

The $P_A$ pulse is output in a direction 90 degrees counter-clockwise from and at a power level 6 dB lower than the $P_1$, $P_3$, and $P_4$ pulses. The $P_B$ pulse is output in a direction 90 degrees clockwise from and at a power level 6 dB lower than the $P_1$, $P_3$, and $P_4$ pulses. The purpose of the $P_A$, and $P_B$ pulses is to suppress intruders who are in a different quadrant from the interrogation direction from answering the sidelobe signals of a directional interrogation. The $P_A$ and $P_B$ signals are not output in many of the lower power interrogation steps and are not output from omni-directional antennas.

An intruder answers an interrogation when it detects two pulses 21 us apart. However, when two pulses 2 us apart are detected the intruder suppresses its answer. The $S_1$, $P_A$, and $P_B$ pulses are all suppression pulses, intended to lead to a tendency for different intruders to answer different interrogations or at least to limit the number of intruders answering a particular step.

Even though the $P_1$ and $S_1$ pulses are output in the same directions with $S_1$ being at a lower power level than $P_1$, it is still statistically possible for the intruder to detect the $S_1$ pulse and not the $P_1$ pulse. For example if the power level of the $P_1$ pulse is such that the probability of detection is 98% and the power level of the $S_1$ pulse is such that the probability of detection is 20%, there is a $(0.02)(0.20) = 0.4\%$ probability that the $P_1$ pulse will not be detected and the $S_1$ pulse will be detected. Other mechanisms which could lead to the $S_1$ pulse being detected and the $P_1$ pulse not being detected are constructive and/or destructive interference with signals from other sources and a change in the path loss between the time of arrival of the two signals. Similarly, the intruder could detect the $P_B$ pulse and not the $P_3$ pulse. Since the $P_B$ pulse is output in a different direction than the $P_3$ pulse, the spatial location of the intruder is another factor which could determine which signal is detected. If the $S_1$ and $P_B$ pulses are detected and the $P_1$ and $P_3$ pulses are not detected by the intruder there is a possibility that the intruder will answer the $S_1/P_B$ pulse pair, rather than the $P_1/P_3$ pulse pair. This will result in a reply 2 us too early, leading to a range approximately 0.162 nmi too short.

Similarly, if the $P_A$ and $P_4$ pulses are detected by the intruder and the $P_1$ and $P_3$ pulses are not detected, the intruder will answer the $P_A/P_4$ pulse pair rather than the $P_1/P_3$ pulse pair. This leads to a reply 2 us too late, leading to a range approximately 0.162 nmi too long. This is sometimes referred to as the suppression pulse replies. The terms suppression pulse replies and suppression pulse tracks are used to refer to replies and tracks which are either 2 us early or 2 us late due to the intruder answering the wrong pulse pair.

Although it is desirable for an intruder to answer exactly one interrogation in a surveillance period, it is common for a single intruder to answer several interrogations in a Whisper-Shout sequence. Also, it is possible for multiple replies from a single intruder to be received in response to a single interrogation. An example of multiple replies from a single intruder to a single interrogation is to have both a direct reply and a multipath reply generated by the reply bouncing off the ground or a nearby building, more fully described in the aforementioned U.S. Pat. No. 5,107,268. It is possible for the intruder to answer different pulse pairs in response to different steps in the Whisper-Shout sequence or in different surveillance periods. If the duplicate replies from a single intruder within a surveillance period indicate nearly the same range, the duplicates are eliminated in the duplicate reply elimination process. Note that there are other requirements more fully discussed in the aforementioned patent which must be met for duplicate reply elimination such as an altitude criteria, but the range criteria is the only one pertinent to this discussion. The 2 us early, normal, and 2 us late replies are separated in range by large enough distances that the range criteria for duplicate reply elimination are not met. Therefore, it is possible for a single intruder to provide replies of three distinct ranges (normal, 2 us early, and 2 us late) disregarding multipath in a single surveillance period which are still present after duplicate reply elimination. Note that single reflection multipath (either the interrogation or the reply bounce off the ground) and double reflection multipath (both the interrogation and the reply bounce off the ground) can result from each of these three pulse pairs.

These 2 us early and 2 us late replies lead to false tracks. In instances where the transponder is not operating properly, the intruder can respond to all three pulse pairs, a condition which has been observed. The method of the preferred embodiment of the present invention of reducing these false tracks includes the steps of permitting tracks to form on the suppression pulse replies, identifying the tracks as suppression pulse tracks, and preventing the suppression pulse tracks from becoming established for use by the Collision Avoidance System (CAS) logic for threat determination thereby preventing these suppression pulse tracks from being displayed to the pilot and from causing false alerts.

Figure 5:
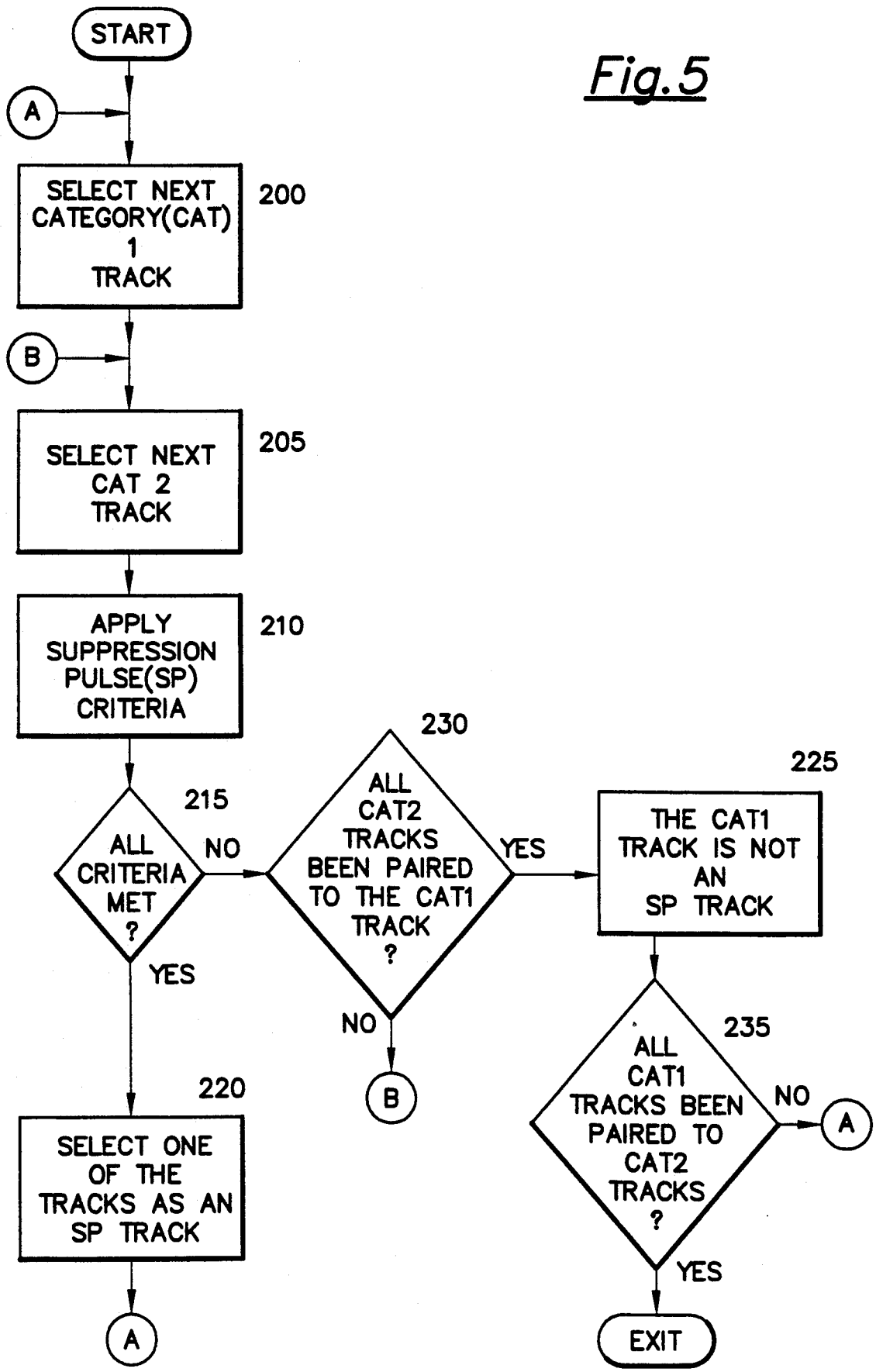
FIG. 5 shows a flow diagram of the method of the preferred embodiment of the present invention.

Referring to FIG. 5, there is shown a flow diagram of the track identification according to the method of the preferred embodiment of the present invention. Two categories of tracks are defined, (1) candidate suppression pulse tracks and (2) tracks from which suppression pulse tracks can be formed. It is possible for a particular track to fit both categories. The track types that can be considered candidate suppression pulse tracks are as follows:

Category 1 Tracks

| | |
|---|---|
| NE | Non-Established Tracks [This includes both non-established tracks which have not been identified as suppression pulse tracks in the past (NENSPP) and non-established tracks which have been identified as suppression pulse tracks in the past (NESPP).] |
| SP | Suppression Pulse Tracks [Tracks which are currently identified as suppression pulse tracks.] |
| I | Image Tracks [Tracks which are currently identified as image tracks i.e.,; those tracks formed on multipath replies.] |
| ESPP | Established Tracks which have been identified as Suppression Pulse Tracks in the past. |

NOTE:
The only tracks which are excluded from being considered as candidate suppression pulse tracks are established tracks which have never been identified as suppression pulse tracks in the past (ENSPP).
The track types from which suppression pulse tracks can be formed are as follows:

Category 2 Tracks

| | |
|---|---|
| NE | Non-Established Tracks [This includes both non-established tracks which have not been identified as suppression pulse tracks in the past (NENSPP) and non-established tracks which have been identified as suppression pulse tracks in the past (NESPP).] |
| E | Established Tracks [This includes both established tracks which have not been identified as suppression pulse tracks in the past (ENSPP) and established tracks which have been identified as suppression pulse tracks in the past (ESPP).] |

NOTE:
Suppression pulse tracks of image tracks and suppression pulse tracks of suppression pulse tracks are not allowed.

The suppression pulse criteria are applied to each pair of tracks in which one track is a category 1 track and the other track is a category 2 track to determine whether one of the tracks should be selected as a suppression pulse track (block 200, 205). If all of the suppression pulse criteria are met (block 210, 215) then one of the tracks is selected as the suppression pulse track in accordance with the suppression pulse track selection criteria outlined below (block 220). Otherwise, neither track of this track pair is considered a suppression pulse track (block 225, 230). After all the category 1 tracks are tested against all the category 2 tracks (block 230, 235), the testing is exited. If the track selected as the suppression pulse track is not established (non-established, image, suppression pulse) then the track status is set to suppression pulse track immediately. If the track selected as the suppression pulse track is an established track (ESPP), its track status is changed to suppression pulse after the suppression pulse criteria have been passed for this track in three consecutive surveillance periods. A suppression pulse track must fail the suppression pulse criteria for six consecutive surveillance periods before being reclassified as a non-suppression pulse track.

The suppression pulse criteria are as follows:

| | |
|---|---|
| Range | The two tracks must have ranges within 0.162 nmi ± 0.06 nmi of each other. |
| Range Rate | The two tracks must have range rates within 80 kt of each other. |
| Altitude | The two tracks must have altitudes within 100 feet of each other. |
| Bearing | The two tracks must have bearings within 20 degrees of each other. |

If it is determined that one of the tracks should be selected as the suppression pulse track, the following rules are applied to determine which one should be selected as the suppression pulse track.

Suppression Pulse Track Selection

| Category 1 Track | Category 2 Track | Track Selected as Suppression Track |
|---|---|---|
| NENSPP | NENSPP | Longest Range Track |
| NENSPP | NESPP | NESPP Track |
| NENSPP | E (ENSPP or ESPP) | NENSPP Track |
| NESPP | NENSPP | NESPP Track |
| NESPP | NESPP | Longest Range Track |
| NESPP | E (ENSPP or ESPP) | NESPP Track |
| SP | NE (NENSPP or NESPP) | SP Track |
| SP | E (ENSPP or ESPP) | SP Track |
| I | NE (NENSPP or NESPP) | I Track |
| I | E (ENSPP or ESPP) | I Track |
| ESPP | NE (NENSPP or NESPP) | NE Track |
| ESPP | ENSPP | ESPP Track |
| ESPP | ESPP | If Track Age Difference is Greater Than 9, Shortest Age Track. Otherwise, Longest Range Track. |

It is possible for a track to be identified as both a suppression pulse and an image track at the same time. If this happens, the track cannot be established until it becomes neither an image nor a suppression pulse track. The criteria for an image track to become a non-image track and for a suppression pulse track to become a non-suppression pulse track must be met independently.

All tracks which are classified as suppression tracks are not candidates for CAS establishment. Therefore, suppression pulse tracks will not be given to CAS and therefore will not be displayed or be used to select alerts. Checks are made for both single reflection and double reflection multipath of suppression pulse tracks. Thus, there can be images of suppression pulse tracks.

Since the suppression pulse criteria are tighter than the image criteria, the suppression pulse tracks have precedence over the image tracks in selecting replies. Therefore, the track update order from highest to lowest priority can be suppression pulse tracks which are not also image tracks, suppression pulse tracks which are also image tracks, and image tracks, consistent with the update ordering described in the above mentioned related patent application Ser. No. 07/687,965. A second approach of track update order is to treat all image tracks as the same priority level, regardless of whether they are also suppression pulse. This second approach of treating all image tracks as the same priority level is implemented in the preferred embodiment of the present invention.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In an aircraft having a tracking system, wherein said aircraft interrogates all target aircraft in the vicinity of said aircraft in order to determine potentially dangerous situations, said interrogation having a predetermined interrogation sequence which includes interrogation pulses and suppression pulses, said target aircrafts responding to said interrogation with predetermined parameter information, the target aircraft sometimes responding to the suppression pulses of the interrogation resulting in an indication of false tracks to the aircraft, a method of reducing the false tracks resulting from replies to the suppression pulses, comprising the steps of:
   a) forming tracks on responses to the interrogations wherein the responses meet a first set of predetermined criteria;
   b) identifying tracks as suppression pulse tracks or non-suppression pulse tracks in accordance with a second set of predetermined criteria, and
   c) inhibiting tracks labelled as suppression pulse tracks from being displayed by the tracking system as a potentially dangerous target aircraft to the aircraft.

2. In an aircraft having a tracking system, a method of reducing false tracks according to claim 1, wherein the step of forming includes the step of labeling said tracks to form a first category of tracks and a second category of tracks.

3. In an aircraft having a tracking system, a method of reducing false tracks according to claim 2, wherein the step of identifying comprises the steps of:
   a) selecting a track pair, wherein a first track of the track pair is from the first category of tracks and a second track of the track pair is from the second category of tracks, said track pair being a new track pair;
   b) applying a third set of predetermined criteria to the track pair;
   c) if the third set of predetermined criteria is met for the track pair,
      i) selecting one of the tracks of the track pair as a suppression pulse track in accordance with a fourth set of predetermined criteria; and
      ii) proceeding to step (a); otherwise
      iii) selecting another track to form a new track pair; and
      iv) if all track pair combinations have been tested,
         1) exiting the process of the method; otherwise
         2) proceeding to step (a).

4. In an aircraft having a tracking system, a method of reducing false tracks according to claim 3, wherein the step of applying a third set of predetermined criteria includes the step of:
   comparing the range, range rate, altitude, and bearing of of each of the track pair to verify the values of each parameter are within predetermined limits of each other.

5. In an aircraft having a tracking system, a method of reducing false tracks according to claim 4, wherein the fourth set of predetermined criteria comprises suppression pulse track selection criteria.

6. In an aircraft having a tracking system, wherein said aircraft interrogates all target aircraft in the vicinity of said aircraft in order to determine potentially dangerous situations, said interrogation having a predetermined interrogation sequence which includes interrogation pulses and suppression pulses, said target aircraft responding to said interrogation with predetermined parameter information, the target aircraft sometimes responding to the suppression pulses of the interrogation resulting in an indication of false tracks to the aircraft, a method of reducing the false tracks resulting from replies to the suppression pulses, comprising the steps of:
   a) forming tracks on responses to the interrogations wherein the responses meet a first set of predetermined criteria;
   b) identifying tracks as suppression pulse tracks or non-suppression pulse tracks in accordance with a second set of predetermined criteria to subsequently eliminate suppression pulse tracks from the output of the tracking system.

* * * * *